United States Patent
Bantz et al.

(10) Patent No.: US 7,464,163 B1
(45) Date of Patent: Dec. 9, 2008

(54) SERVICE PROVISIONING VIA ATTRIBUTE-BASED SUBSCRIPTION

(75) Inventors: David F. Bantz, Chappaqua, NY (US); Sunil K. Sreenivasan, Mount Kisco, NY (US); Yosef Teitz, Hashmonain (IL)

(73) Assignee: International Business Machines Corporation, Armonk, NY (US)

( * ) Notice: Subject to any disclaimer, the term of this patent is extended or adjusted under 35 U.S.C. 154(b) by 1678 days.

(21) Appl. No.: 09/626,430

(22) Filed: Jul. 27, 2000

(51) Int. Cl.
G06F 15/173 (2006.01)
H04L 12/16 (2006.01)
H04Q 11/00 (2006.01)
G06F 15/16 (2006.01)

(52) U.S. Cl. .................... 709/226; 370/259
(58) Field of Classification Search ......... 709/238, 709/226; 370/259
See application file for complete search history.

(56) References Cited

U.S. PATENT DOCUMENTS

| | | | | |
|---|---|---|---|---|
| 5,748,896 A | * | 5/1998 | Daly et al. | 709/223 |
| 5,781,624 A | * | 7/1998 | Mitra et al. | 379/244 |
| 5,812,533 A | * | 9/1998 | Cox et al. | 370/259 |
| 5,951,649 A | * | 9/1999 | Dobbins et al. | 709/238 |
| 6,363,053 B1 | * | 3/2002 | Schuster et al. | 370/230 |
| 6,452,915 B1 | * | 9/2002 | Jorgensen | 370/338 |
| 6,459,682 B1 | * | 10/2002 | Ellesson et al. | 370/235 |
| 6,480,861 B1 | * | 11/2002 | Kanevsky et al. | 707/103 Y |
| 6,625,650 B2 | * | 9/2003 | Stelliga | 709/226 |
| 6,631,122 B1 | * | 10/2003 | Arunachalam et al. | 370/332 |
| 6,744,767 B1 | * | 6/2004 | Chiu et al. | 370/395.21 |
| 6,842,783 B1 | * | 1/2005 | Boivie et al. | 709/225 |
| 6,986,157 B1 | * | 1/2006 | Fijolek et al. | 725/111 |
| 7,054,943 B1 | * | 5/2006 | Goldszmidt et al. | 709/229 |

(Continued)

FOREIGN PATENT DOCUMENTS

EP 1049297 A2 * 11/2000

(Continued)

OTHER PUBLICATIONS

Bhoj, Preeti et al. "SLA Management in Federated Environments", Hewlett-Packard Internet Systems and Applications Laboratory, HPL-98-203, Dec. 1998, 13 pages.*

*Primary Examiner*—George C Neurauter, Jr.
(74) *Attorney, Agent, or Firm*—Harrington & Smith PC

(57) ABSTRACT

Disclosed is a method, a system and a computer program that is embodied on at least one computer readable medium for service provisioning a customer with at least one software application from a service provider. In the case of the computer program embodiment there is provided first executable code for establishing a set of attributes of the service provision; second executable code, responsive to a user input, for selecting from the set of attributes for defining a Service Level Agreement (SLA) with the service provider; third executable code for provisioning the customer, within the constraints imposed by the SLA, by allocating at least some required data processing resources to at least one of the service provider, the customer, to another service provider, or to a data processing site that offers data processing capacity for use; and fourth executable code for transparently re-provisioning the customer, within the constraints imposed by the SLA, by re-allocating at least some required data processing resources between at least one of the service provider, the customer, the another service provider, or the data processing site that offers data processing capacity for use.

16 Claims, 9 Drawing Sheets

U.S. PATENT DOCUMENTS

| | | | |
|---|---|---|---|
| 7,058,704 B1 * | 6/2006 | Mangipudi et al. | 709/223 |
| 7,082,463 B1 * | 7/2006 | Bradley et al. | 709/223 |
| 7,120,694 B2 * | 10/2006 | Sinha | 709/228 |
| 2001/0025310 A1 * | 9/2001 | Krishnamurthy et al. | 709/223 |
| 2002/0188720 A1 * | 12/2002 | Terrell et al. | 709/225 |

FOREIGN PATENT DOCUMENTS

WO     WO 9625012 A1 * 8/1996

* cited by examiner

SERVICE PROVISIONING VIA ATTRIBUTE-BASED SUBSCRIPTION

FIELD OF THE INVENTION

The teachings of this invention relate in general to methods and apparatus for managing services in a network of computers, and more particularly relate to a network of computers that includes a group of server computers belonging to a Service Provider (SP), from which services are made available to at least one group of client computers that are used by a customer of the SP to access the services.

BACKGROUND OF THE INVENTION

Service Providers (SPs) may implement several models of service provision. In a basic hosting model, the SP provides dedicated computing and shared networking equipment, and the customer installs software on the computing equipment to provide the desired services, with the responsibility remaining with the customer for the monitoring and maintenance of the installed software. In a variation of this model, referred to as outsourcing, the SP does the installation, maintenance and monitoring of the software. In the application service provision, or ASP model, the SP owns the equipment and software and maintains it, and charges customers for its use. A common feature of all of these models is the consolidation of computing and networking equipment and skilled personnel at the Service Provider's site.

These various models all provide several advantages to the service customer. To varying degrees, the customer is relieved of the responsibility of purchasing and financing the hardware and software needed to provide the service. The customer may also be relieved of the continuing responsibility to monitor and maintain the hardware and software, as well as from the need to employ skilled Information Technology (IT) professionals to perform the maintenance operations. In the ASP model, especially where the hardware and software are shared among several customers, the costs of the hardware and software may, be shared as well, reducing the cost to each customer to have the service available. If the service has been installed by the ASP for other customers, that service can be made nearly instantly available to a new customer, reducing the delay for that customer to be able to use the service.

However, not all services are good candidates for the SP model, and the networking environment also affects the economics and usability of SP-provided services. Since there is a communication network and a consequent communication delay between the customer's clients and the servers of the SP, services that require rapid response to a user interaction may not be feasible to provide by the SP model.

Further, in some environments the communications network between the customer and the SP may occasionally be unavailable, or the provider of this network may choose to charge for its use in a manner inconsistent with the customer's budget for the service. Finally, the customer may require that certain sensitive data never leave the customer's premises, while the software providing the service may depend on that data being locally accessible.

For these and other reasons, it can be appreciated that the various SP models are not universally applicable, yet the advantages that are realized by their use make them desirable for many customers.

In general, the customer often has the option of providing services from local resources, either clients or servers. However, and especially for the smaller customer who may not have access to skilled IT professionals, or whose access to them may not always be timely, it may not be attractive for the customer to provision the desired services themselves. The problem to be solved may thus be simply stated as follows: the appropriate provisioning of the service should involve execution of components of the service locally, but the SP does not support local provisioning, and the customer does not desire to support his own local provisioning.

Provisioning of a service on the customer's premises can be accomplished using system management technology, examples of which include TME 10™ and IT Director™ software products available from Tivoli Systems, Inc. These products require an agent software component installed on every computer that can be provisioned, and establish a manager/subordinate relationship between a "management server" and each agent. The initiation of software distribution and installation on a client is typically done manually by a console operator, who specifies which software to distribute and what clients to distribute it to. Some SPs are known to remotely manage hardware and software on their customer's premises using system management software.

The resolution of the customer's problem (the need for local provisioning, but the desire not to be responsible for managing the local provisioning) can involve an SP using system management technology, and for some customers this is an economically viable proposition. However, for the smaller customer the need for manual initiation of provisioning by skilled IT professional employees of the SP, and its attendant costs, make this option unaffordable. Even though system management technology enables local provisioning, it itself does not provide the simplicity, speed and low cost that the customer desires. Furthermore, the typical customer does wish to determine the details of how a service is to be provided. The customer has a budget, and within this budget seeks to provision a desired service that optimizes the customer's operational criteria.

These criteria typically include responsiveness (service reaction time to a user interaction), availability (the probability that the service will be available when it is needed), cost of usage of the communications network and privacy and control of sensitive data. The way in which the service is provisioned affects these criteria.

Prior to this invention, a satisfactory solution to these problems was not available.

U.S. Pat. No. 5,748,896, "Remote Network Administration Methods and Apparatus", to Daly et. al. discloses a method for a management server to obtain information about service instantiations for the purposes of displaying the status of those instantiations on a management console, wherein the management server need not have been programmed to be aware of all of the types of services that it will actually deal with. This is achieved by storing service objects with the components of the service, these service objects being programmed to be aware of the specific service that the associated component can be used to instantiate. The sequestering of service-specific programming in these service objects permits the management server to be unaware of the details of the services it manages. Daly et. al. does not, however, address the process of instantiation of the services, nor does it address the flexible instantiation of services that is an aspect of this invention. Daly et al. also does not disclose a method that uses service attributes specified by the subscriber to drive the instantiation of services in a manner responsive to the subscriber's desires, nor do Daly et al. address the transparent re-instantiation of services.

SUMMARY OF THE INVENTION

The foregoing and other problems are overcome and the objects of the invention are realized by methods and apparatus in accordance with embodiments of this invention.

The teachings in accordance with this invention enable a Service Provider to exploit system management technology to provision services flexibly and automatically, according to selected criteria given by the customer.

In accordance with these teachings service attributes specified by the subscriber are employed to drive the instantiation of services in a manner that is responsive to the subscriber's desires, and a transparent re-instantiation of services are also provided.

The teachings of this invention relate to methods and apparatus for managing services in a network of computers, particularly in the case that the network contains a group of server computers belonging to an application service provider, or ASP, from which services are made available to at least one other group of client computers used by a customer of the SP to access these services.

The teachings of this invention provide a method, a system and a computer program that is embodied on at least one computer readable medium for service provisioning a customer with at least one software application from a service provider. In the case of the computer program there is provided first executable code for establishing a set of attributes of the service provision; second executable code, responsive to a user input, for selecting from the set of attributes for defining a Service Level Agreement (SLA) with the service provider; third executable code for provisioning the customer, within the constraints imposed by the SLA, by allocating at least some required data processing resources to at least one of the service provider, the customer, to another service provider, or to a data processing site that offers data processing capacity for use; and fourth executable code for transparently re-provisioning the customer, within the constraints imposed by the SLA, by re-allocating at least some required data processing resources between at least one of the service provider, the customer, the another service provider, or the data processing site that offers data processing capacity for use.

A further aspect of these teachings is a business model by which services can be provided to a customer by a virtual service provider using data processing resources offered by data processing sites, wherein the virtual service provider need not own or control the data processing resources used to provision its customers.

An embodiment of the invention is a method for service provisioning a customer with at least one software application from a service provider, comprising steps of: establishing a set of attributes of a service provision; receiving selections from said set of attributes, the selections defining a Service Level Agreement (SLA) with the service provider, wherein the SLA comprises a plurality of constraints; provisioning a service for at least one client computer of the customer in accordance with constraints imposed by the SLA by allocating at least some required data processing resources for the service to at least one of the service provider, the customer, to another service provider, or to a data processing site that offers data processing capacity for use; and re-provisioning the customer, within the constraints imposed by the SLA, by re-allocating at least some of the required data processing resources for the service to the resources of the customer.

Another embodiment of the invention is a data processing system for service provisioning a customer with at least one software application from a service provider, said service provider and said customer being coupled together through a communication network, said system comprising: a system management server for establishing a set of attributes of a service provision; and a customer interface for selecting from said set of attributes for defining a Service Level Agreement (SLA) with the service provider, said system management server being responsive to said SLA for provisioning at least one client computer of the customer in accordance with constraints imposed by the SLA by allocating at least some required data processing resources for a service to at least one of the service provider, the customer, to another service provider, or to a data processing site that offers data processing capacity for use; and re-provisioning the customer, within the constraints imposed by the SLA, by re-allocating at least some of the required data processing resources for the service to the resources of the customer.

A further embodiment of the invention is a computer program embodied on a computer readable medium for service provisioning a customer with at least one software application from a service provider, said program comprising: first executable code for establishing a set of attributes of a service provision; second executable code for providing the set of attributes to a customer through a graphical user interface and for receiving selections from said set of attributes entered using the graphical user interface, the selections defining a Service Level Agreement (SLA) with the service provider, wherein the SLA comprises a plurality of constraints; third executable code for provisioning the customer, within the constraints imposed by the SLA, by allocating at least some required data processing resources for a service to at least one of the service provider, the customer, to another service provider, or to a data processing site that offers data processing capacity for use; and fourth executable code for re-provisioning the customer, within the constraints imposed by the SLA, by re-allocating at least some required data processing resources for the service to the resources of the customer.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
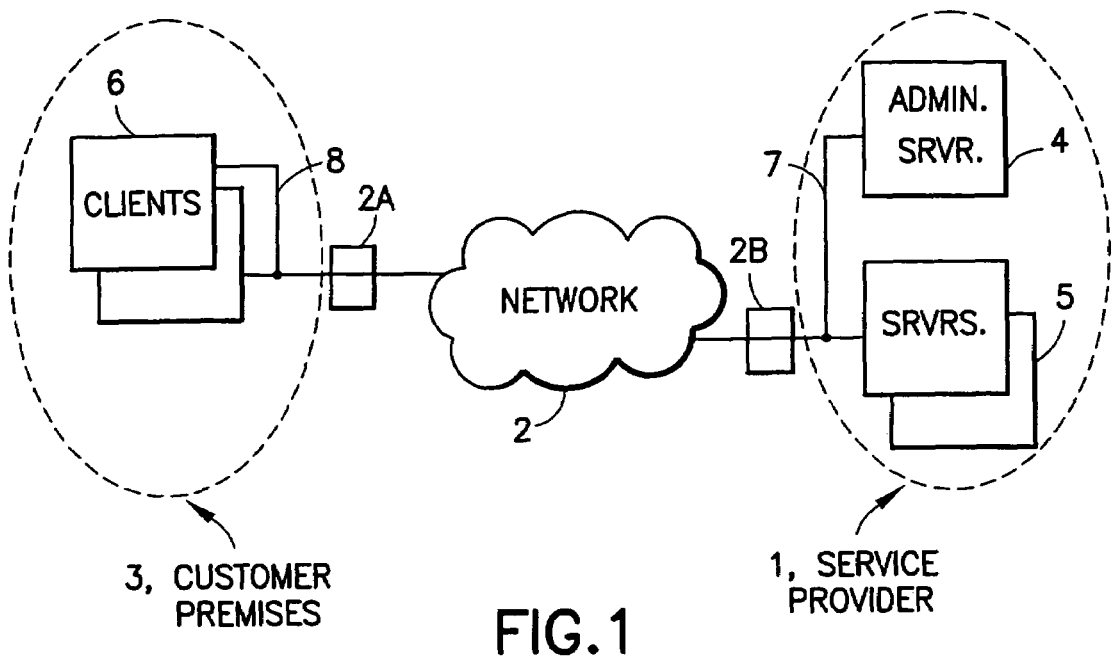
FIG. 1 is a representation of a customer premises containing access clients, connected through a computer network to a service provider.

FIG. 1 illustrates client computers 6 located on customer premises 3, connected to one another via a local area network (LAN) 8 and connected through a network interface 2A to a computer network 2, such as the Internet or any suitable data communication network. A service provider premises 1 is similarly connected to computer network 2 through a network interface 2B, thus enabling data communication with the customer premises 3. At service provider premises 1 are shown servers 5 and an administrative server 4 connected via LAN 7. Services to customers are provided from the servers 5, while subscription by customers to services is accomplished by administrative server 4 which directs servers 5 via messages sent over LAN 7.

Figure 2:
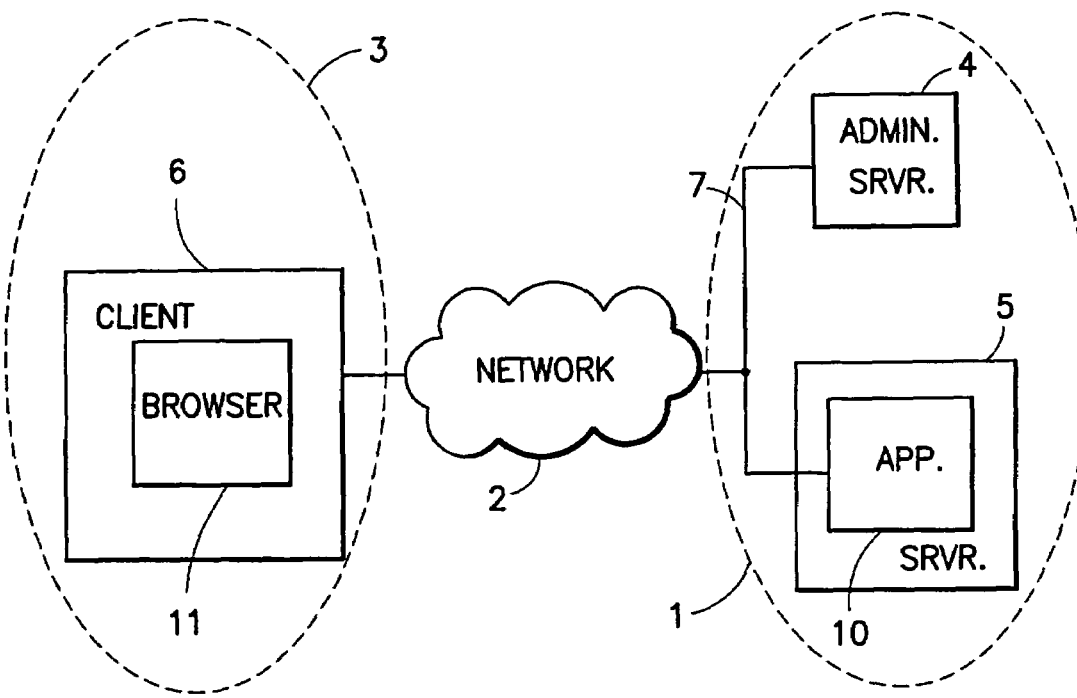
FIG. 2 shows a typical service provision in the ASP model, with the client access software and the service provision accomplished via an application running on the SPs server.

FIG. 2 elaborates on FIG. 1, and illustrates two units of software, specifically a browser 11 and an application 10, which together typically provision a service for the customer. Browser 11 functions in a manner substantially independent of the specific service provided by application 10, except that browser 11 may be customized via plug-in software (not shown). In general, FIG. 2 illustrates a typical ASP providing Web-based services to its customers.

Figure 3:
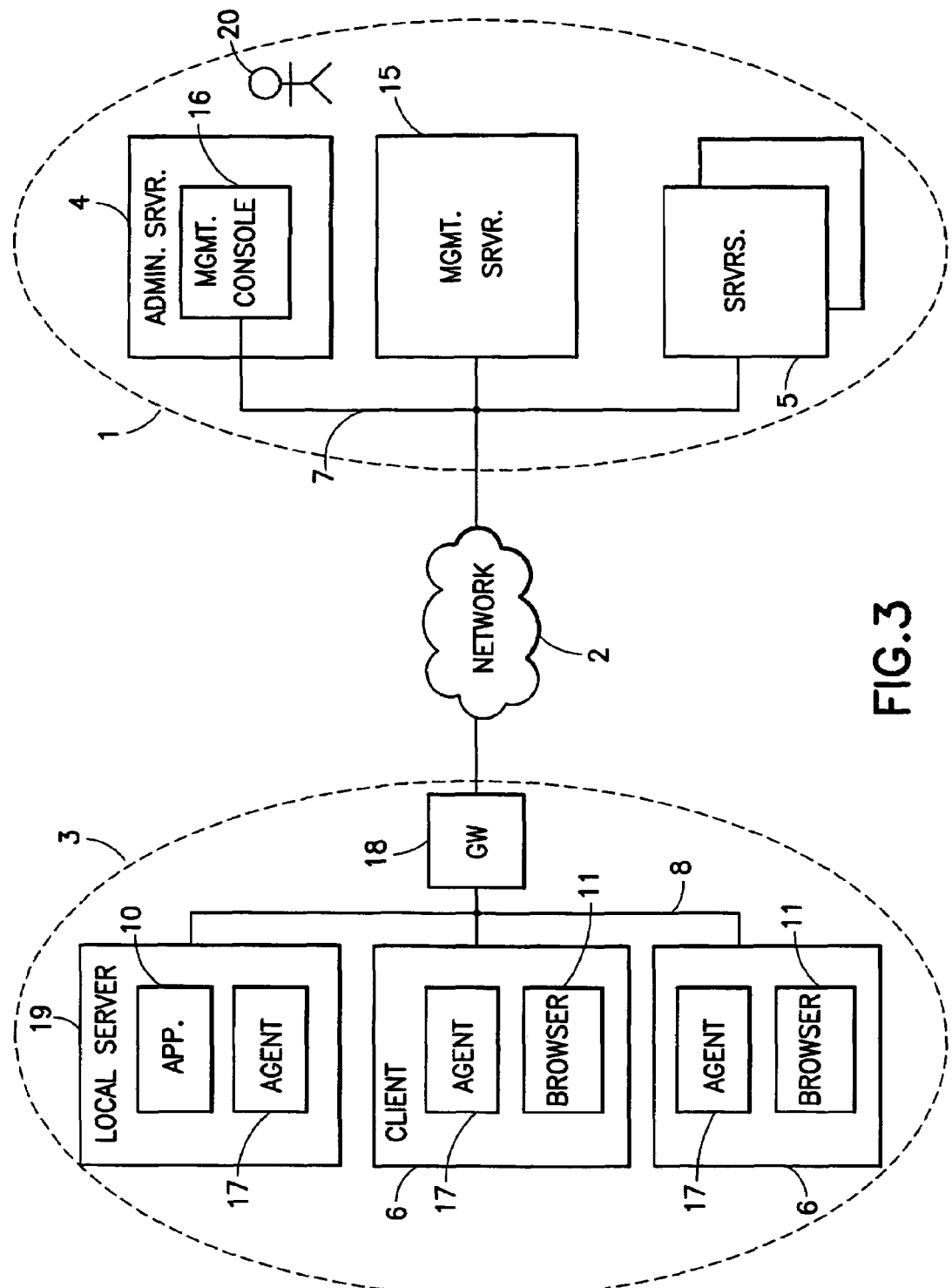
FIG. 3 shows how system management software can reside in the system of FIG. 2, and additionally introduces a means of connection between the customer's local area network and the external computer network.

FIG. 3 depicts an example of how system management software can come to reside in the system of FIG. 2. The system management software includes agents 17 running in clients 6 on the customer premises 3, a management server 15 running systems management software (not shown) and a management console 16. The management console 16 is a unit of software that runs on the SPs administrative server 4. A skilled IT professional, also referred to as a management console operator 20, by using management console 16, is enabled to view output from management server 15 and to control the management server 15 via the LAN 7.

Additionally, FIG. 3 shows a gateway 18 connecting the customer LAN 8 to the communication network 2. Messages flow from the services provisioned on servers 5 through gateway 18 to client browsers 11, and from management server 15 through gateway 18 to agents 17. Also depicted in FIG. 3 is an optional local server 19 that contains an application 10 for local service provisioning, and an agent 17.

As was previously discussed, the incorporation of system management software in FIG. 2, resulting in the system of FIG. 3, enables the provisioning of services more flexibly than in the typical ASP system of FIG. 2. The management console operator 20 operating management console 16 can cause software to be distributed via management server 15, computer network 2, and gateway 18 to any computer on customer premises 3 that contains an agent 17. For example, the application 10 in local server 19 may have been downloaded and installed via system management software at the discretion of the management console operator 20.

Figure 4:
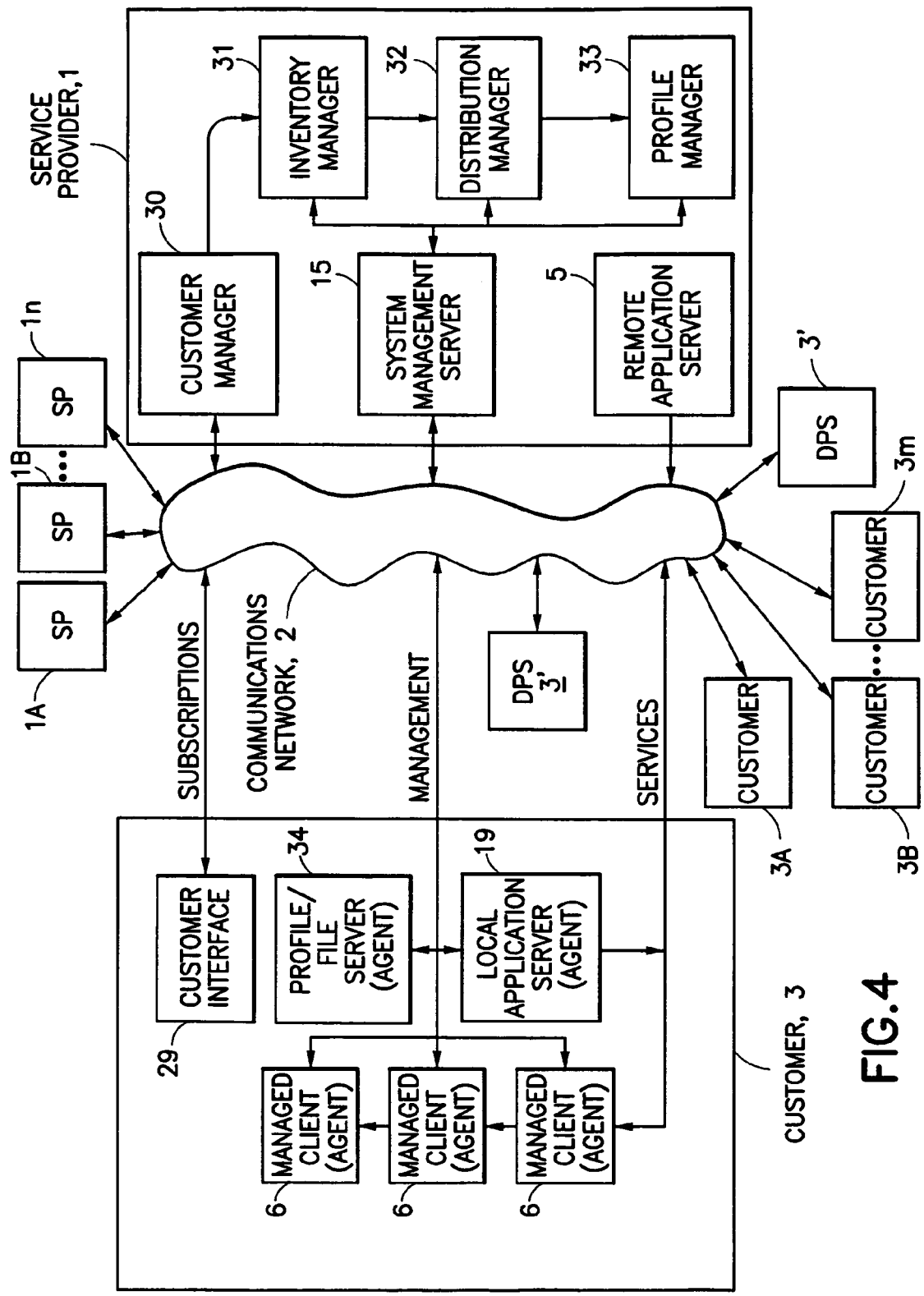
FIG. 4 is a software block diagram that relates to the system of FIG. 3, and that illustrates components of the present invention that, working with the system components of FIG. 3, accomplish the flexible attribute-based service instantiation.

FIG. 4 is a software block diagram that relates to the system of FIG. 3, and shows additional system components that are employed to accomplish the object of the invention of providing flexible, attribute-based service provisioning. Illustrated is additional infrastructure 29 and 34 on the customer's premises 3 and additional infrastructure 30, 31 and 32 on the SP's premises 1 for determining feasible service provisionings and their attributes, for offering these as alternatives to the customer, for accepting customer selection(s), and for directing management server 15 to automatically provision the selected service in accordance with the selected service attributes. The customer site software components 29 and 34 may run on dedicated servers, on the local server 19 (see FIG. 3) or on any one of the clients 6. The SP sited software components 30, 31 and 32 can preferably run on administrative server 4 of FIG. 3, on the application server 5, or on the management server 15.

The overall process of flexible provisioning will now be described with reference to FIG. 4, which should be viewed in conjunction with FIG. 5, which shows an overall flowchart of the process.

Service provisioning begins with a desire on the part of the customer for access to a service. The customer invokes a customer interface 29 preferably by using a browser to display a Web page and invoking an applet that implements the customer interface 29 (Step 40 in FIG. 5). At Step 41 the customer identifies himself to the customer interface 29, which then transmits a message to customer manager 30 containing this identification. The customer manager 30 then consults a database to verify the customer's authorization to subscribe to services, and to create a list of services that the customer may subscribe to, and returns this list in Step 42 of FIG. 5 to the customer interface 29. It is noted that FIG. 5 assumes that the customer is an authorized customer, and does not deal with the case that the customer is not authorized by the SP to subscribe to any services.

Figure 5:
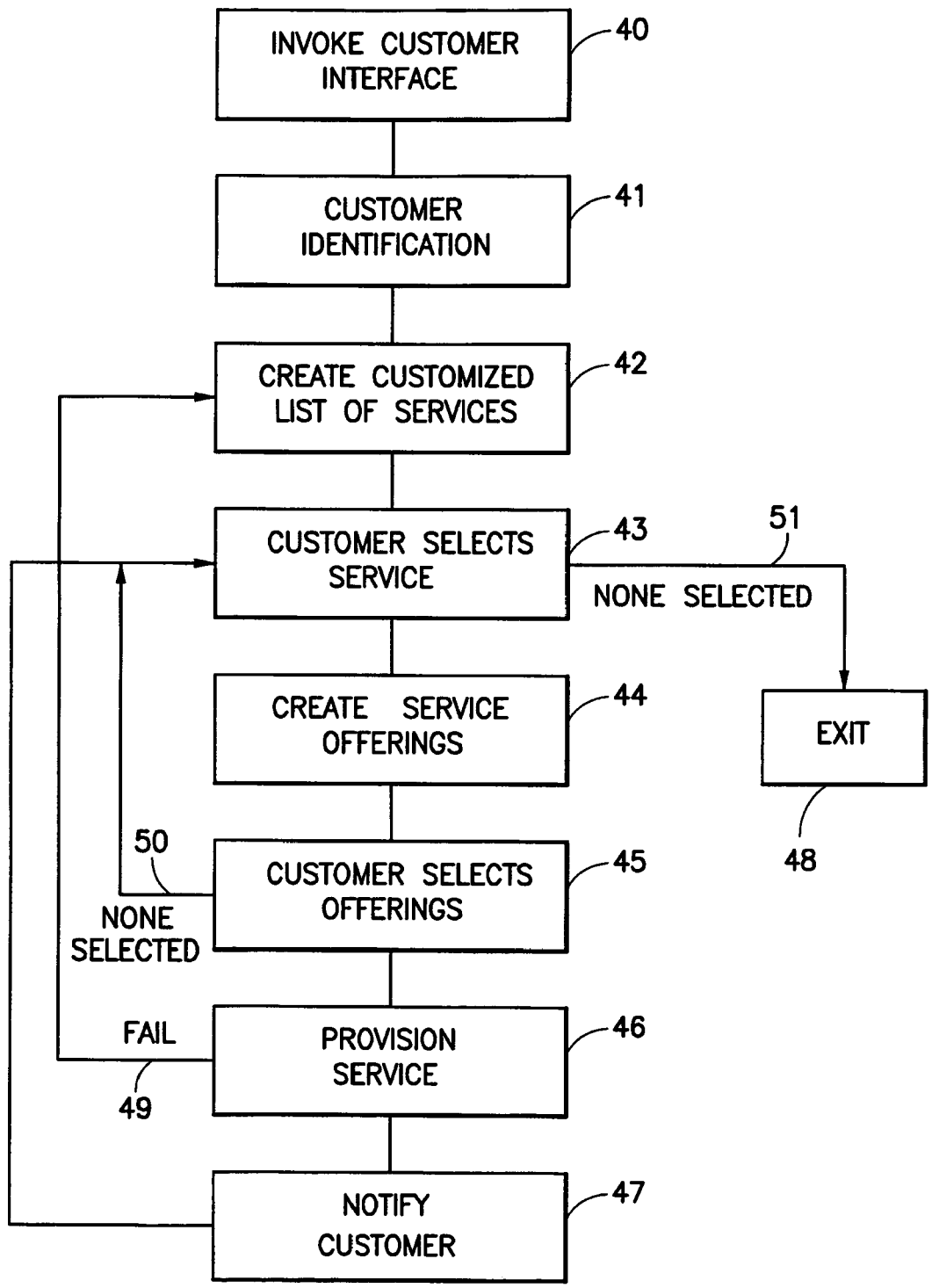
FIG. 5 is a flowchart that describes the overall flow of processing.
Figure 6:
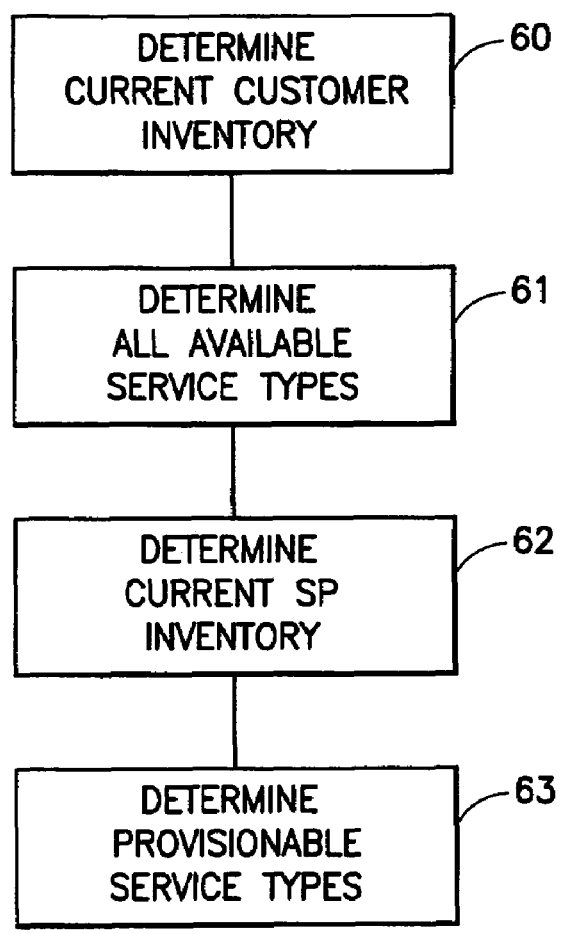
FIG. 6 is a flowchart that describes the details of the creation of a customized list of services for a specific customer.

The creation of the customized list of services in Step 42 of FIG. 5 is illustrated by the flowchart of FIG. 6. Referring now to FIG. 6, the process begins with block 60, in which the customer manager 30 of FIG. 4 queries the inventory manager 31 of FIG. 4 for the current customer inventory of hardware and software. The inventory manager 31 may have a current inventory available, or it may have to use the capabilities of the system management server 15 of FIG. 4 to capture a current inventory. The ability of system management software to capture the hardware and software inventory of a customer is well-known in the state of the art.

Next, in Step 61 of FIG. 6, the customer manager 30 of FIG. 4 queries a database of available service types. The data returned from this query includes the prerequisites for the provisioning of each service. For example, for the WordPerfect™ service of a word processing service type, productivity category, the database entry may contain data indicating that this service can be provisioned on Linux™ and Windows™ platforms.

Next, in Step 62, the customer manager 30 queries the inventory manager 31 for the current SP inventory of hardware and software that is available to satisfy a new provisioning. The inventory manager 31 may have a current inventory available, or it need to capture a current inventory via the capabilities of system management server 15 of FIG. 4, together with other data descriptive of the resource availability of the SPs' inventory.

In Step 63 the customer manager 30 of FIG. 4 performs an intersection operation on the data returned to the queries of Steps 60, 61 and 62 to determine which services have a feasible provisioning. If the databases of service types and of the inventories of the customer and the SP are relational databases, the intersection can be accomplished by a process known as a "join", a well-known process in the art (e.g., C. J. Date, "An Introduction to Database Systems", volume I, Addison-Wesley 1991). For example, if the table returned from the query of Step 61 is referred to as a "service_table", and has columns "service" and "needs", and the table returned from the query of Step 60 is referred to as a "customer_inventory_table" and has a column "has", the SQL statement to create a table of services for which the customer has the necessary prerequisites is:

SELECT service FROM
service_table,customer_inventory_table WHERE
service_table.needs=customer_inventory table.has The actual processing of Step 63 of FIG. 6 can be more complex because of the alternate provisionings possible (customer site or SP site), and because the prerequisites listed in the service table returned from the query in Step 61 may have AND or OR relationships. However, the process is a straightforward extension of what has been described above, and would be familiar to those skilled in the art of database design and use, based on these teachings.

Considerations other than service prerequisites may be used to determine the customized list of services. For example, although an entertainment service with violent content could be provisionable to an elementary school library, the SP may choose to block the provisioning of this service to this customer.

It is to be noted that the process of determining the customized list of services may be lengthy and time-consuming if performed as described above. Fortunately neither the inventory of service types, customer hardware and software or SP hardware and software change very frequently, and the expected frequency of customer service subscription is low. This implies that the process of determining the customized list of services can be performed incrementally and at a time at which the resources needed for this process are conveniently available. For example, if a new resource is installed at the customer's premises, it is only necessary to update the customized list for that customer if this resource represents a new and different capability. However, if it duplicates existing resources, then no new services need be enabled by its installation. If the new resource does represent a new and different capability, then the resultant customized list is increased, and then only by those services whose prerequisites had not been satisfied by the customer's inventory before the installation of the new resource.

The end result of Step 63 of FIG. 6 is the customized list of services to be presented to the customer.

Figure 7:
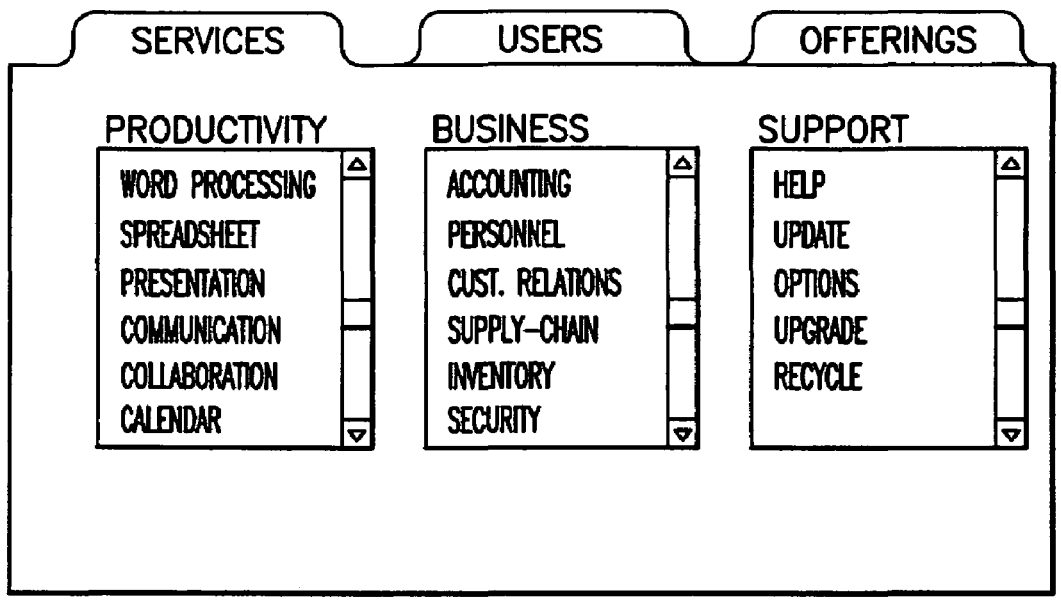
FIG. 7 is an example of a user interface for service type selection.

The customer interface 29 then presents the customized list of services to the customer. FIG. 7 shows one exemplary implementation of the visual appearance of the customer interface 29, using a tab-and-folder metaphor, and in which the folder for service selection is shown. The specific details of the implementation of the customer interface 29, in terms of its visual representation to the customer, can take a number of different forms, and the example depicted in FIG. 7 is not intended to be viewed in a limiting sense upon the practice of the teachings herein. What is of more importance is the identification of the information to be presented, as well as the solicitation of specific selections by the user (customer).

FIG. 7 shows an example of a Services folder of the customer interface 29. Different categories of services (e.g., productivity, business and support) are shown, with available service types shown in each category (e.g., under Productivity: Word Processing, Spreadsheet, Presentation, Communication, Collaboration and Calendar). The SP may show only service types for which an offering can be made, or it may show all available service types, with some indication of those that are not available to the customer. If the latter option is used, the SP may support right-click of the mouse or some other input signal to present a pop-up description of why that service type is not available to that customer. For example, if a customer selects a service type that the SP provides only by installing software natively on a computer running Linux™, and that customer has only the Windows™ operating system installed on the customer's clients, then that service type is not currently available to that customer.

Using the customer interface 29, as illustrated in the example of FIG. 7, the customer selects a service type to subscribe to. In the case that the user does not select any service type before switching to some other view, no message is sent to the customer manager 30. This case is shown in FIG. 5 as the branch 51 to Step 48, which exits the process of flexible provisioning. Otherwise, the customer manager 30 receives a message from the customer interface 29 containing an identification of the desired service type, and then creates a list of service offerings and returns that list to the customer interface 29. The selection of the service type is represented in FIG. 5, Step 43, and the creation and transmission of the service offerings is represented in Step 44. The creation of the list of service offerings may be a complex process, and is illustrated by the flowchart of FIG. 8, discussed in detail below.

Figure 9:
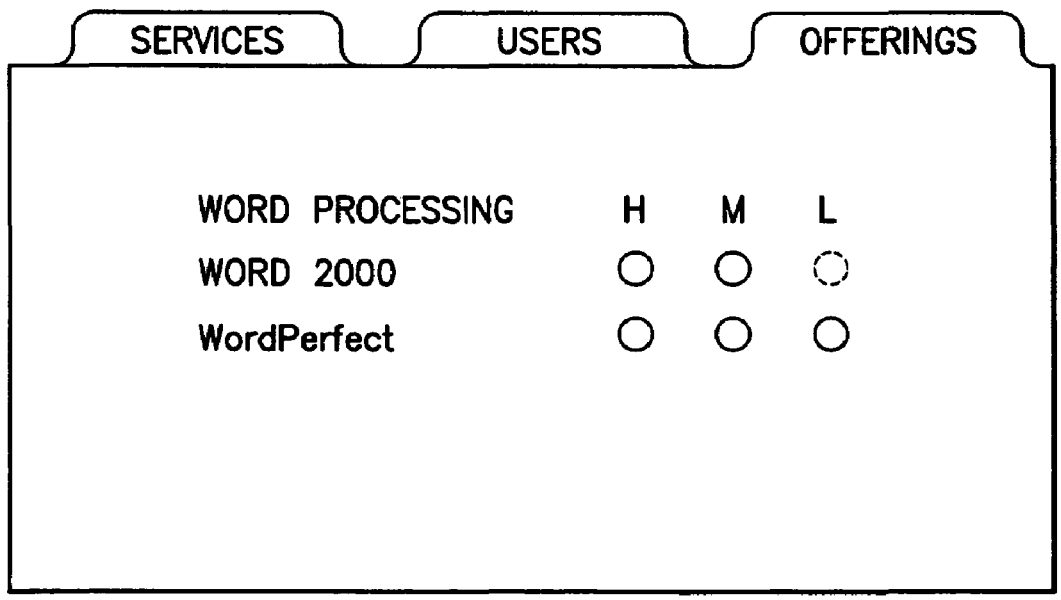
FIG. 9 is an example of a user interface for service and service attribute selection.

The user interface for service offering selection, shown in FIG. 9, is now described. FIG. 9 depicts an example of a service offerings folder of the customer interface 29 of FIG. 4, as it might appear had the customer selected Productivity services/Word Processing from the services folder of the customer interface 29 depicted in FIG. 7. Two exemplary services are shown in FIG. 9: i.e., Word 2000™ and WordPerfect™ word processing software packages. To the right of the names is shown an array of radio buttons. The term "radio button" is familiar to those skilled in the art of user interface design and connotes exclusive selection. Thus, the customer can select either the H, M or L options (High, Medium, Low interactivity) for WordPerfect™ or the H or M options for Word 2000™ (the L radio button is not available and is shown in dashed outline). Each of these options corresponds to a service offering by the SP. For example, an H option may refer to a service offering for which the service provider has dedicated high-performance resources, while an L option may refer to a service offering for which the service provider has provided only shared resources. The user interface might preferably allow right-clicking the mouse on a radio button to bring up a pop-up description of the terms of the service-level agreement being offered. For example, the pop-up description of the H radio button for WordPerfect™ may give the cost per month, the interactivity supported (e.g., "highly-interactive"), and the availability (e.g., "99.9% uptime, or better"). This offering might be made by the SP on the basis of evaluating the customer inventory and finding an available client computer with appropriate processing power and disk free space.

Figure 8:
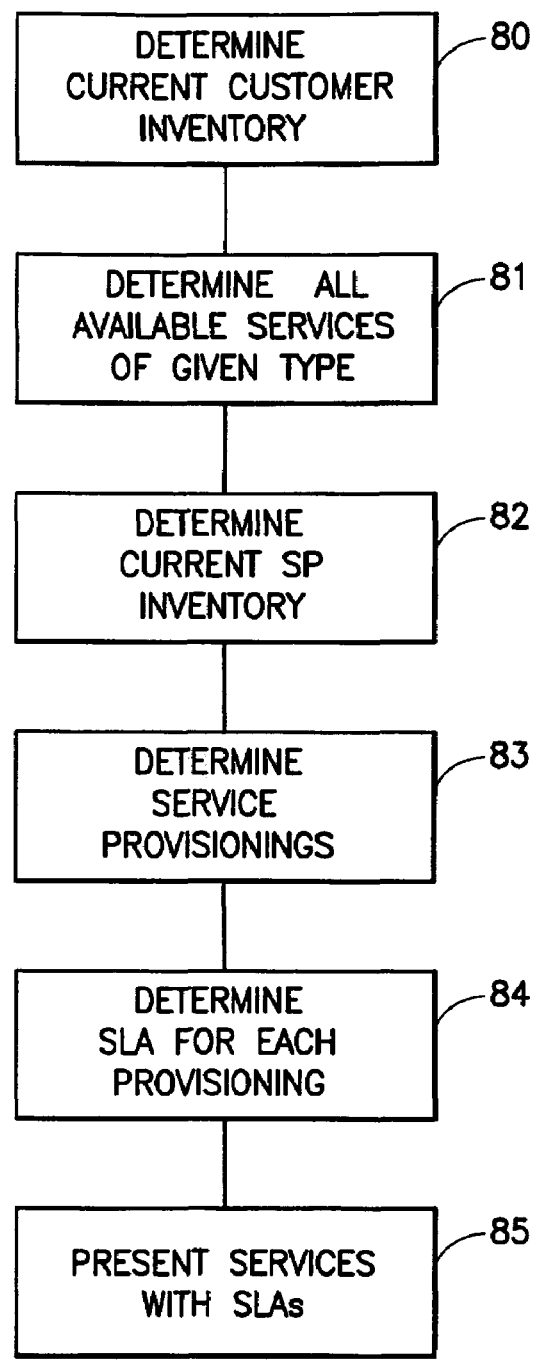
FIG. 8 is a flowchart that describes the details of the creation of service offerings.

As was noted previously, the creation of the service offerings in Step 44 of FIG. 5 may be a complex process, and is illustrated by the flowchart of FIG. 8. The process begins with Step 80, where the customer manager 30 determines the current customer inventory of hardware and software in a manner that can be identical to that of Step 60 in FIG. 6. In fact, the customer's inventory can be cached by the inventory manager 31 of FIG. 4 so that no database access need take place, if there have been no changes to the customer inventory subsequent to the earlier inventory. Similarly, caching optimizations can be applied to Step 82, which is analogous to Step 62 of FIG. 6. Step 81 of FIG. 8 queries a database in which all possible provisionings of each service are listed. For example, one provisioning of a service might be that the software providing the service runs in a server, that software providing an access client runs in a client computer and that the client computer be capable of communicating with the remote-access server. Finally, in Step 83 an intersection operation is performed, this time listing all possible provisionings of each service of given type.

As an example, suppose that the service Word 2000™ requires a Windows™ platform, and that the customer has at least one client computer running Windows™ and also has a remote-access server, such as one implemented by Microsoft Windows Terminal Services™, together with Citrix MetaFrame™, capable of running Windows™ software. In this case the process depicted in Step 83 of FIG. 8 would yield two possible provisionings of Word 2000™: one in which the software that provides Word 2000™ services is installed on the customer's client computer, and the other in which the software is installed on the customer's WTS/MetaFrame™ server.

Step 84 of FIG. 8 then associates a service level with each possible provisioning of a service. One possible implementation of this process employs a set of templates, each listing one possible configuration of a service provisioning. For example, one template might be "client/LAN/server", where the provisioning corresponds to an interactive client piece of software running on a client computer, communicating over a local-area-network to a local applications server, running the body of the service. The performance level of each element could be determined by reading parameters from the actual provisioning (e.g., the LAN is a 10 Mb/sec. switched Ethernet). Each template has an associated procedure which computes a set of service attributes. The example template might compute a cost attribute of $8.50/mo, an interactivity attribute of "moderately-interactive" and an availability attribute of "98% uptime, or better". The SP can employ any suitable procedure for determining the values of each of these attributes for each of the services.

The process of associating a service level with each possible provisioning thus involves determining which template best fits a candidate provisioning, and running the associated procedure.

Step 85 of FIG. 8 is presented with a list of services, each with one or more provisionings, and each having an associated Service Level Agreement, or SLA. The task of Step 85 is to winnow this list to conform with the SPs policies for the presentation of service offerings to the customer. In the example above concerning Word 2000™, there are two attributes which should be examined in order to determine the best provisioning for the H or M selectors of FIG. 9.

One feasible procedure for reducing the two attributes to either the H or M classification is to represent each attribute type as the axis of a multidimensional space (in this case, a two-space) and to represent the classifications H and M as regions in this space. A given provisioning is represented by the values of its attributes; this determines which region of the classification space the provisioning is found in. The implementation of this decision procedure is a simple list of comparisons with the boundaries of the space. If no feasible provisioning falls in a region of the space then that SLA is not offered. If multiple provisionings fall in a region, the SP could choose to offer, by example, the least expensive, or the best-performing, or could choose based on some other criteria. The end result of Step 85 of FIG. 8 is a list of services, each with a list of SLA categories, representing distinct service offerings.

Using the customer interface 29 as illustrated in FIG. 9, the customer then selects the desired service offering (Step 45 of FIG. 5). It may be the case that no service offering is selected. This case is shown in FIG. 5 as branch 50 to Step 43, which redisplays the customized list of service types. Otherwise, the customer interface 29 transmits a message containing the selected service offering to customer manager 30, which then provisions the service. Step 46 of FIG. 5 represents the provisioning of the selected service at the selected service offering. This can be a complex process, and is described with reference to the flowchart of FIG. 10.

From Step 81 of FIG. 8 a list of all services, each with all provisionings, is determined. A single entry in this list is selected by the customer in Step 45 of FIG. 5.

Figure 10:
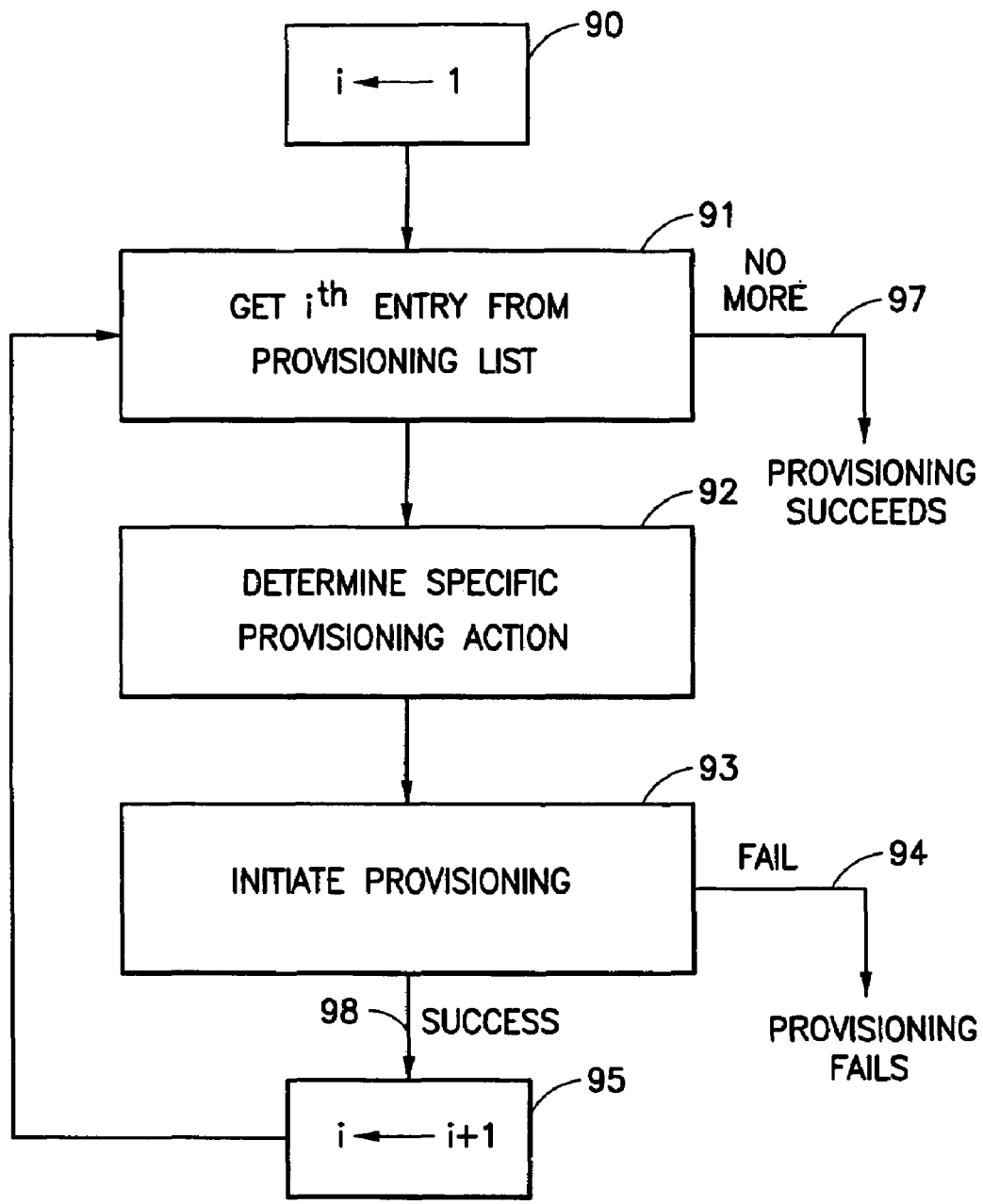
FIG. 10 is a flowchart that describes the details of service provisioning.

FIG. 10 describes the provisioning of the selected service, given this entry, and thus depicts in detail the operation of Step 46 of FIG. 5. Step 90 of FIG. 10 initializes an action index variable which Step 91 uses to select a component of the service to provision from the entry provided. If there are no more components to provision branch 97 is taken and provisioning of all components has been successful. Step 92 examines the component to determine a specific provisioning action: for example, does this component have to be installed on a server, or does that server already have the software installed? Is the installation on a client computer or on a server? The specific action to be taken is initiated in Step 93, which employs the facilities of the system management server 15 of FIG. 4 to accomplish the indicated action.

If the indicated action for some reason cannot be accomplished, branch 94 in FIG. 10 causes the overall provisioning operation to fail. Although not shown, it may be desirable for the process of FIG. 10 to back out or undo actions performed for a specific provisioning prior to the action that failed. The provisioning failure at this point results in the procedure taking the fail branch 49 of FIG. 5 to re-execute Step 42 (create customized list of services).

If the current (i-th) action is successful, branch 98 is taken, the action index variable is updated, and control returns to Step 91 to get the next entry from the provisioning list. The process thus iterates until the last entry of the provisioning list is processed, or until a provisioning action fails.

As such, it may be the case that through some circumstance the attempt to provision the selected service at the selected service level fails. One example is a failure of one or more clients or servers involved in the service provisioning between the time the service offering is made and the customer selection of the offering. The failure is represented in FIG. 5 by the above-mentioned branch 49 to Step 42, which shows actions by the customer manager 30 to re-determine the customized list of services. Other actions may also be appropriate at this time, such as initiating diagnostic procedures to discover the cause of the failure of the provisioning attempt and to remedy it. The nature and the extent of these actions is beyond the scope of these teachings, and are not further considered herein.

If the provisioning succeeds, Step 47 in FIG. 5 is executed, notifying the customer of the success of the subscription to the selected service offering, followed by re-creation of the customized list of service types in Step 42.

In the present invention, the end user of a service activates his or her use of the service preferably by clicking on a desktop icon associated with that service, although other service activation techniques could be employed. That is, in a manner known in the art the successful provisioning of a service can be accompanied with the presentation of an icon on the desktop of the user that is subscribed to the service. The appearance of the icon and the manner by which the end user activates the service can be completely independent of the details of the service instantiation. For example, if the service is provisioned locally on the user's client computer, the desktop icon is associated with link information designating the path to the software that resides on the client computer, and the operating system of the client computer interprets a click or double-click on the icon as a command to launch the associated executable. If the service is instead provisioned on a local application server, the desktop icon is associated with link information designating the path to the client software that resides on the client computer, together with parameters to that client software designating the service instantiation on the local application server. If the service is instead provisioned on a remote application server the process is similar to that for a local application server, except that the communications path to the server is represented differently.

This system behavior, wherein the end user of a service need not be aware of the specifics of the instantiation of that service, is referred to herein as "service-instantiation transparency" (SIT). SIT facilitates service re-instantiation, permitting the SP 1 to change the service instantiation without requiring any action or even awareness on the part of the end user.

It will be appreciated from the foregoing discussion that although the invention has been described with respect to initial subscription and selection of attributes, these teachings can be employed as well to enable a subscription to update a previous subscription. The response of the system to a re-provisioning request can be identical to that of a request for initial provisioning, except that it may be of value to remove service components needed for the former provisioning. The removal of these components can be accomplished in a manner similar to their installation, using the mechanisms described in FIG. 10. If the current subscription removes all need for provisioning of a service, for example because the current subscription is a request to un-subscribe from the last known user of the service, then all service components can be removed, while if the service must remain provisioned then only those components no longer necessary for any current provisioning can be removed.

It will be further appreciated that the overall service provisioning process depicted generally in FIG. 5, while shown as initiated in response to a selection of service type, service and attributes by the customer 3, may as well be initiated by the SP 1 in response to situations known only to the SP 1. As an example, a customer 3 is subscribed to a service provisioned from the SP's servers, and the SP 1 is informed of a planned or predicted network outage of known duration. Such an outage would result in the disruption of service provision to the customer 3, and thus a failure to provision the customer 3 within the constraints of the selected Service Level Agreement (SLA). In this case the SP 1 may choose to re-provision the service temporarily on server or client computer(s) on the customer's premises so that this disruption does not occur, and again re-provision the service on its own servers when the network outage is over. The SIT property of the user interface to service invocation facilitates this re-provisioning operation.

The example given above can be extended to the case where certain resource conditions occur without prior warning. It is well-known in the art that system-management and network-management software can be configured to monitor the degree of resource utilization and end-to-end service response time, and can generate warnings and alerts when these are no longer satisfactory. With reference to FIG. 8, Step 84, a change in resource availability can cause the computation of the SLA for some provisionings to change, perhaps no longer meeting the SLA desired by the customer 3. Instead of maintaining the provisioning as is, a comparison can be made between the SLA desired and the revised SLAs of the various provisionings, and then, for example, the least-expensive provisioning is chosen that realizes the desired SLA. The service is then re-provisioned accordingly. As negative resource availability issues clear, system and network management software can generate alerts to that effect, and the temporary re-provisioning can be reversed to the original provisioning.

In general, an aspect of these teachings is an ability to transparently re-provision the customer, within the constraints imposed by the SLA, in response to a change in data processing resource utilization, and/or in response to a change in predicted or actual data processing resource availability, and/or in response to a failure of a data processing resource, and/or based on some SP 1 criterion or criteria.

A business model has been described in which services can be provided with differing functional, performance and availability attributes, among others, and where the differing instantiations of desired services can be differentially priced. Specifically, a service can be offered at the lowest level of function, performance and availability at a price that is attractive to a customer 3, even to the point of free provision of the service. As the customer 3 explores the lowest-level service instantiation and relates it to the specific needs of the customer 3, the customer 3 can then alter the subscription to improve the level of functionality, and/or to improve the performance, and/or the availability of the service, with an attendant, possibly increased, cost and revenue to the SP 1.

An aspect of these teachings is that the re-instantiation of the service is accomplished in a manner that is not disruptive to the end user of the service, and also realizes the goal of improved service in the specific manner desired. This capability supports what is known in the art of marketing as "upsell", or the selling of a perceived incremental improvement of some attribute of a service with a consequent increase in revenue to the SP 1.

It may be the case that a service can be re-provisioned by the SP 1 to improve the service attributes at little or no additional expense to the SP 1. Specifically, if the service is provisioned at the minimum level of performance, the appropriate instantiation of the service could be to run the software implementing the service on an applications server on the premises of the SP 1. A higher-performance instantiation of the service may be to run the software implementing the service on the client computer of the customer 3, simultaneously increasing the customer's perceived level of service while reducing the costs to the SP 1. This is made possible by relieving the SP 1 from having to provide the software, networking and hardware resources to run the service remotely.

Additional opportunities are made possible for the SP 1 in the case that the customer 3 is a business with the need for several of the customer's staff to have simultaneous access to the service. By example, the customer 3 may normally expect that additional service subscription charges would accrue for each additional user, however, the hardware, networking and software resources that the service provider 1 must provide increase with the number of simultaneous users when the service is instantiated from servers on the premises of SP 1. In this case the SP 1 may choose to re-instantiate the service using customer 3 resources. This can be based on a criterion that as the number of simultaneous users increases, the reduction in the resource consumption on the servers 5 of the SP 1 results in a reduction of the costs of the SP 1. Thus, the freedom to instantiate and re-instantiate services by the SP 1 is constrained only by the implicit or explicit service-level agreement (SLA) that the customer 3 agrees to when selecting service attributes. Within the constraints imposed by the SLA, the SP 1 may instantiate or re-instantiate the service in any manner to, for example, reduce its costs, improve the customer-perceived quality of service, or compensate for upgrades to or failures in hardware, software and/or the communication network 2.

The ability to dynamically re-instantiate a service, that is a feature of the teachings of this invention, has an additional load-balancing advantage to the SP 1. For example, the resource consumption of SP-provided resources may be increasing to the point where the SP 1 may no longer be able to meet its service-level agreements. Within the teachings of this invention, the SP 1 may negotiate with other SPs, either locally or globally, to temporarily instantiate services on their servers rather than on its own. This negotiation can be accomplished using electronic means, preferably mediated through an electronic marketplace (e-marketplace). Similarly, if the SP 1's resources are under-utilized it is free to offer those resources through the e-marketplace to other SP 1s, using the present invention.

This aspect of the teachings of this invention can be seen in FIG. 4, wherein other SPs 1A, 1B, . . . , 1n are shown coupled to the communication network 2. Other customers 3A, 3B, . . . , 3m are also shown coupled to the network 2, as are other data processing sites (DPS) 3', which may or may not be customers of the SP 1, and which may or may not primarily function as SPs in their own right. For example, the one or more of the DPSs 3' could be data processing installations that offer excess data processing capacity for use by the SPs 1, 1A, 1B, . . . , 1n. The significance of these additional SPs, customers and DPSs will be made evident in the ensuing discussion.

For example, it may be the case that the SP 1 is a "Virtual SP" who offers service subscriptions, but which has little or no resources of its own to provision the offered services. In this case the Virtual SP may obtain the required resources to fulfil its SLAs from customer-provided hardware and software, and/or from other SPs (1A, 1B, . . . , 1n) that are willing to provision the service.

This latter business model, that of the Virtual SP, can be extended to a model in which the resources necessary to provision a service are widely distributed. It is well-known in the state of the art that computation may be distributed across many computational nodes in a computer network: e.g., the distributed computation currently employed in the Search for Extra-Terrestrial Intelligence (SETI), wherein signal-processing tasks are distributed to thousands of personal computers in order to increase the total computational capacity available for the job and to utilize otherwise un-utilized capacity in personal computers on the Internet. In the case of SETI, this capacity is volunteered by the owners of these personal computers. In the business model considered herein, owners of personal and other types of computers connected to the same computer network, preferably the Internet, participate as small-scale SPs in the services marketplace, registering their unused capacity and their rates for use with a large-scale e-marketplace. These small scale SPs can be one or more of the SPs 1A, 1B, . . . , 1n, and/or the DPSs 3', and/or one or more of the customers 3A, 3B, . . . , 3m that may offer spare data processing capacity for use by the SP 1. The teachings of this invention make it practical to flexibly instantiate and re-instantiate services across a large, widely-dispersed network of potentially small SPs, such as one or more of the SPs 1A, 1B, . . . , 1n, and/or one or more of the customers 3A, 3B, . . . , 3m, as well as the DPSs 3', within the constraints of the SLAs that a given SP 1 is obligated to fulfil.

Figure 11:
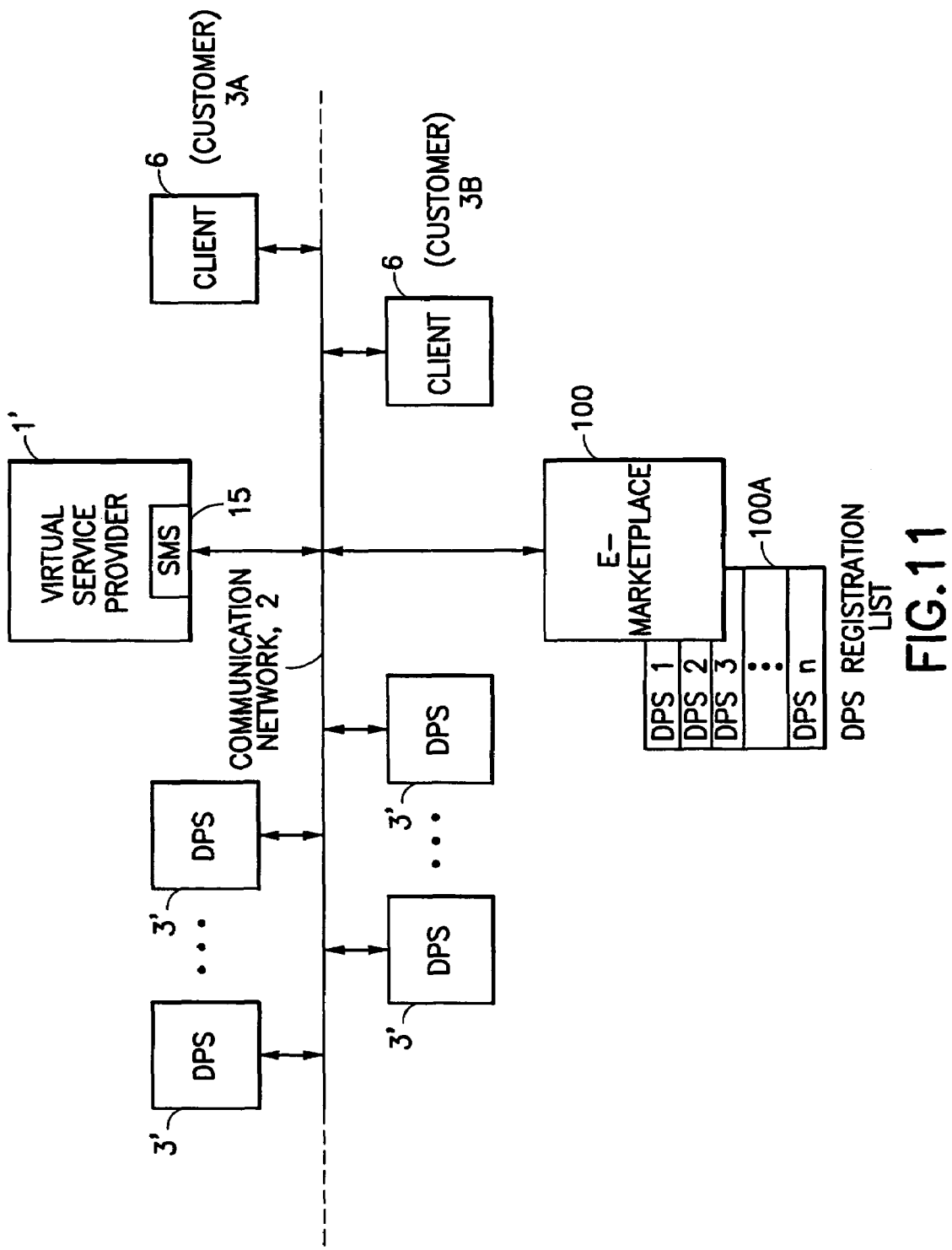
FIG. 11 is a system block diagram of a virtual service provider embodiment of these teachings.

As such, it can be appreciated that an aspect of the teachings of this invention is a system for service provisioning a customer with a software service. Referring to FIG. 11, a plurality of data processing sites, such as the other data processing sites (DPS) 3', are coupled to the communication network 2, which may be the global Internet. Individual ones of DPS 3' include program code for registering available data processing capability using the communication network 2. The available data processing capability can be registered in one or more suitable units such as, but not limited to, available processor seconds, available MIPS, available storage capacity, available application software, and so forth. In a preferred embodiment the a DPS 3' registers the available data processing capability with one or more electronic marketplaces (e-marketplace) 100, which maintains a DPS registration list 100A for reporting the registered data processing capability, a requested compensation rate and other pertinent information, such as a network address of registered DPSs 3', encryption capabilities, public keys and the like. The DPSs 3' could be fixed or mobile personal computers, workstations, mainframe computers or any type of suitable data processing devices or systems. The DPSs 3' could be owned/controlled by individuals, corporations, other SPs, governmental agencies, educational institutions, and so forth.

A virtual service provider 1' is coupled to one or more customers 3A, 3B through the communication network 2. The virtual service provider 1' includes the system management server (SMS) 15 or similar functionality for establishing a set of attributes for a particular customer's service provision, and for allocating data processing capability for provisioning the customer from the data processing capability registered by the plurality of data processing sites 3'. This is preferably accomplished by accessing the e-marketplace 100 and the DPS registration list 100A, determining with one or ones of the registered DPSs 3' are offering data processing capability that will satisfy the set of customer attributes, and negotiating for and acquiring the necessary data processing capability. The virtual SP 1' then provisions the customer (e.g., 3A) using one or more of the DPSs 3' that are registered in the DSP registration list 100A. Another customer (3B) can be provisioned using the same or a different one or ones of the registered DSPs 3'.

Further in accordance with the teachings herein, the virtual service provider 1' can also include the customer interface 30 for enabling the customer to select from the set of attributes for defining the Service Level Agreement (SLA) with the virtual service provider 1'. In this case the system management server 15 is responsive to the SLA for provisioning the customer (3A, 3B) in accordance with constraints imposed by the SLA.

The transparent re-instantiation of services is of advantage to the customer 3 in that it supports the ability of the customer 3 to flexibly choose whether to provide services themselves from the resources within their own IT capabilities, or to outsource the provisioning of the desired services from an SP 1. In this business model the software implementing the present invention may be sold to the IT department of the customer 3, rather than to the SP 1.

Consulting services may also be sold to install and configure the software appropriately to the specific needs of the enterprise. The above-described "service-instantiation transparency", or SIT, attribute that is a feature of the teachings of this invention permits the IT department to choose freely whether to provision a service from their own resources or to outsource. This capability supports, for example, the transparent evolution of an enterprise's IT from in-house to out-of-house provisioning.

The SIT model supports yet another business model, i.e., that of the services marketplace. In this model, the SP 1 makes access to services available to the customer 3 and also supports a service-provision negotiation facility whereby the customer 3 can negotiate with a multiplicity of the SPs (1, 1A, 1B, . . . , 1n) for the most favorable provisioning. Prior to the present invention this business model was impractical to implement, as the end customers 3 of the services would be disrupted each time the service was re-instantiated. With the present invention, however, there is no barrier to the customer 3 changing service providers at any time, subject only to the equivalence of the services provided by alternate providers. It can be appreciated that the business model of providing software and services to an enterprise is in fact a special case of the services marketplace, in which the internal IT department of an enterprise is providing the marketplace.

At the present time, small businesses often turn to Value-Added Resellers (VARs) or Independent Consultants (ICs) to obtain assistance in installing and maintaining their computer systems. VARs make a business of selling hardware and software and represent special expertise in installing and customizing this hardware and software to the needs of the customer 3.

The teachings of this invention support a business model analogous to the VAR, which may be referred to as a Value-Added Services Reseller, or VASR. In this business model, the VASR, which may be one of the SPs 1, 1A, 1B, . . . , in, integrates services provided by one or more of these SPs with services provided, optionally, by the VASR itself, and possibly also with services provided by the IT department of the customer 3. The VASR model provides value to the customer 3, and realizes revenue as a consequence of that value, through the increased convenience and productivity that results from the integration of these services. Although this business model might be practiced without the teachings of this invention, the VASR model is enhanced by these teachings, in that the SIT aspect of the teachings of this invention enables a flexible choice of service provisionings and of service providers. For example, the use of the VASR model may provide an evolutionary path to outsource all of the requirements of the customer 3, without discontinuities appearing to the end users (customers 3). The VASR is similarly free to provision or outsource services to others.

Even in the case of total IT outsourcing it may still be advantageous for the SP 1, VASRs included, to provision some services using resources available on the premises of the customer 3. This is because the software for certain services may depend on extremely high-bandwidth, low-latency paths between its components in order to provide acceptable interactivity. An example of such software is that which supports image manipulation and computer-aided design (CAD). The present invention facilitates mixed provisioning of services since it provides an automated technique to perform mixed provisioning, and also because of the SIT attribute as seen by the end user. The provisioning of services using resources available on the premises of the customer may facilitate the offering of different levels of service by the SP, as illustrated in the user interface of FIG. 9.

Based on the foregoing teachings, it should be appreciated that while the invention has been particularly shown and described with respect to preferred embodiments thereof, those skilled in the art may derive changes in the form and details of these teachings. However, such changes would not depart from the scope and spirit of the invention, as set forth in the various claims that follow, and any such changes in the form and details of these teachings would clearly fall within the scope and spirit of these teachings.

What is claimed is:

1. A method for service provisioning a customer with at least one software application from a service provider, comprising steps of:

establishing a set of attributes of a service provision;

receiving selections from said set of attributes, the selections defining a Service Level Agreement (SLA) with the service provider, wherein the SLA comprises a plurality of constraints;

provisioning a service for at least one client computer of the customer in accordance with constraints imposed by the SLA by allocating at least some required data processing resources for the service to at least one of the service provider, the customer, to another service provider, or to a data processing site that offers data processing capacity for use; and re-provisioning the customer, within the constraints imposed by the SLA, by re-allocating at least some of the required data processing resources for the service to the resources of the customer.

2. A method as in claim 1, and wherein the step of re-provisioning the customer is accomplished in response to a change in the SLA.

3. A method as in claim 1, and wherein the step of re-provisioning the customer is accomplished in response to at least one customer service-related criterion.

4. A method as in claim 1, and wherein the step of re-provisioning the customer is accomplished in response to at least one service provider criterion.

5. A method as in claim 1, wherein said attributes comprise a cost attribute.

6. A method as in claim 1, wherein said attributes comprise an interactivity attribute.

7. A method as in claim 1, wherein said attributes comprise an availability attribute.

8. A method as in claim 1, wherein the service provider is a virtual service provider.

9. A method as in claim 1, wherein the service provider is a value-added services provider.

10. A method as in claim 1, and wherein the step of re-provisioning the customer is accomplished in response to a change in at least one of data processing resource utilization, a change in predicted or actual data processing resource availability, or a failure of a data processing resource.

11. A method as in claim 1, and further comprising a step of re-provisioning the customer, within the constraints imposed by the SLA, in response to a change in predicted or actual data processing resource availability.

12. A method as in claim 1, and further comprising a step of re-provisioning the customer, within the constraints imposed by the SLA, in response to a failure of a data processing resource.

13. A data processing system for service provisioning a customer with at least one software application from a service provider, said service provider and said customer being coupled together through a communication network, said system comprising:

a system management server for establishing a set of attributes of a service provision; and a customer interface for selecting from said set of attributes for defining a Service Level Agreement (SLA) with the service provider, said system management server being responsive to said SLA for provisioning at least one client computer of the customer in accordance with constraints imposed by the SLA by allocating at least some required data processing resources for a service to at least one of the service provider, the customer, to another service provider, or to a data processing site that offers data processing capacity for use; and re-provisioning the customer, within the constraints imposed by the SLA, by re-allocating at least some of the required data processing resources for the service to the resources of the customer.

14. A system as in claim 13, wherein said attributes comprise at least one of a cost attribute, an interactivity attribute, and an availability attribute.

15. A system as in claim 13, wherein the customer is re-provisioned in response to a change in at least one of data processing resource utilization, a change in predicted or actual data processing resource availability, or a failure of a data processing resource.

16. A computer program embodied on a computer readable medium for service provisioning a customer with at least one software application from a service provider, said program comprising:

first executable code for establishing a set of attributes of a service provision;

second executable code for providing the set of attributes to a customer through a graphical user interface and for receiving selections from said set of attributes entered using the graphical user interface, the selections defining a Service Level Agreement (SLA) with the service provider, wherein the SLA comprises a plurality of constraints;

third executable code for provisioning the customer, within the constraints imposed by the SLA, by allocating at least some required data processing resources for a service to at least one of the service provider, the customer, to another service provider, or to a data processing site that offers data processing capacity for use; and fourth executable code for re-provisioning the customer, within the constraints imposed by the SLA, by re-allocating at least some required data processing resources for the service to the resources of the customer.

\* \* \* \* \*